United States Patent
Cervinka et al.

[11] 3,974,901
[45] Aug. 17, 1976

[54] FLUID OPERATOR FOR RELEASING AND RAPIDLY ENGAGING A CLUTCH

[75] Inventors: Jaroslav Cervinka; Oldrich Hofman, both of Divisov; Pavel Husak, Prague, all of Czechoslovakia

[73] Assignee: JAWA, narodni podnik, Tynec nad Sazavou, Czechoslovakia

[22] Filed: Feb. 18, 1975

[21] Appl. No.: 550,214

Related U.S. Application Data
[63] Continuation of Ser. No. 458,121, April 5, 1974, abandoned.

[30] Foreign Application Priority Data
Apr. 16, 1973   Czechoslovakia ................. 2709-73

[52] U.S. Cl. ............................. 192/83; 192/91 A; 192/92; 60/533
[51] Int. Cl.² ..................................... F16D 25/00
[58] Field of Search ................. 192/91 A, 91 R, 83, 192/92, 101, 114 R

[56] References Cited
UNITED STATES PATENTS

| | | | |
|---|---|---|---|
| 1,565,421 | 12/1925 | Craig............................. | 192/114 R |
| 2,078,173 | 4/1937 | Brewer............................ | 192/91 R |
| 2,170,172 | 8/1939 | Wemp............................. | 192/99 R |
| 3,092,229 | 6/1963 | Uher.............................. | 192/99 S X |
| 3,446,324 | 5/1969 | Granata et al.................... | 192/99 S |

*Primary Examiner*—Benjamin W. Wyche
*Attorney, Agent, or Firm*—Burgess Ryan and Wayne

[57] ABSTRACT

A quick closing of a friction clutch for motor vehicles is provided by an arrangement where means acting in the same direction required for maintaining the clutch in the disengaged position are used to further close the clutch.

9 Claims, 5 Drawing Figures

FLUID OPERATOR FOR RELEASING AND RAPIDLY ENGAGING A CLUTCH

This is a continuation of application Ser. No. 458,121, filed Apr. 5, 1974, and now abandoned.

BACKGROUND OF THE INVENTION

The invention relates to an arrangement for operating a friction clutch for motor vehicles, whereby hydraulic or mechanical means by action on a control lever a pressure disk is removed from engagement with a clutch plate.

Arrangements for disconnecting clutches for different motor vehicles are known, in which the clutch is disconnected by pressure of a lever operated by hand or foot and closed by return movement of this lever. The control lever is connected with the clutch by different hydraulic or mechanical devices.

Control arrangements are also known, where auxiliary power is supplied from the engine in order to reduce the force required for disengagement of the clutch.

A drawback of all mentioned systems, particularly when applied for special sport motor cycles is the impossibility of an instantaneous closing of the clutch, resulting in slower starting from rest. In a race, for instance, the driver holding the control lever waits for the signal for starting and releases the lever at this moment; he, of course, has to change the direction of action of the force being applied by his hand or foot by the lever. His reaction is therefore slower.

Automatic systems which would eliminate this drawback offer no favorable results for a quick start.

Summary of the Invention

It is an object of this invention to provide an arrangement for the control of the clutch of a motor vehicle which would enable virtually instantaneous starting, whereby the driver, to close the clutch, would apply a force on the control means of the clutch in the same direction as he uses for maintaining the clutch disengaged. For this purpose, the control means of the clutch are provided with additional means which are operated either independently from the control lever or which are operated by applying additional pressure on the already pressed down control lever.

The improvement achieved thereby consists in that the driver has the possibility of adjusting the control lever when starting to a suitable position and to close at the starting moment instantaneously the clutch either by pressing a control button or by a further movement of the control lever. This arrangement is particularly advantageous for special motor cycles adapted for races on dirt tracks, where a quick start is rather decisive for the result.

Description of Drawings

Examplary embodiments of arrangements according to this invention are shown in the attached drawings, where.

DESCRIPTION OF PREFERRED EMBODIMENTS

Figure 1:
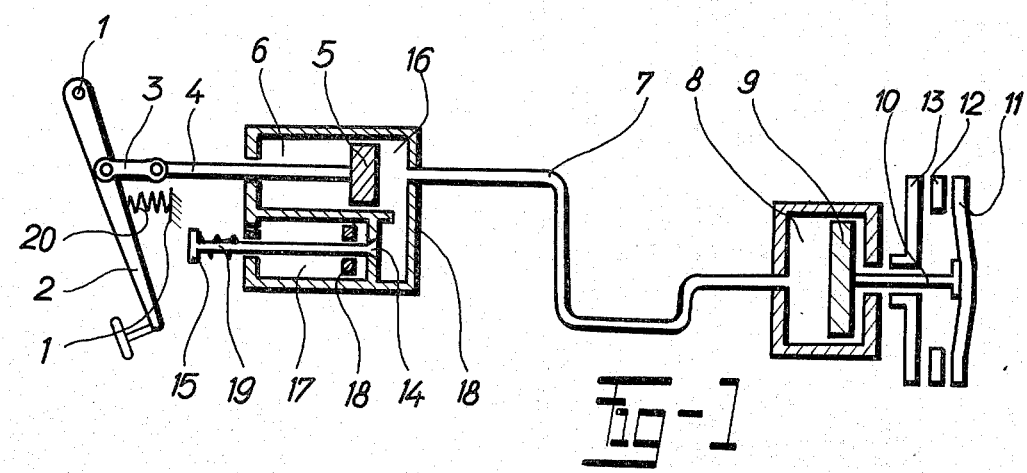
FIG. 1 is a schematic cross sectional view of an arrangement with a disconnected clutch.

With reference to FIG. 1, a control lever 2 is arranged pivotably on the frame 1 and connected via a connecting rod 3 and a piston rod 4 with a main piston 5. The main piston 5 slides in the main cylinder 6, connected by the conduit 7 with the clutch cylinder 8. A clutch piston 9 contacting by its lifter 10 a pressure disk 11 is slidingly arranged in the clutch cylinder 8. The pressure disk 11 normally urges the clutch plate 12 against a base plate 13 to close the clutch springs (not shown). A valve 14, mechanically connected with an auxiliary control button 15, terminates into this main cylinder 6. The valve 14 permits the entrance of pressure liquid 16 into the auxiliary cylinder 17, where an auxiliary piston 18 is slidingly arranged. The auxiliary control button 15 is returned to its original position by a spring 19, the control lever 2 by a return spring 20.

The arrangement is shown in FIG. 1 in the disengaged position. In this case the driver acts with hand pressure on the control lever 2 and must overcome the resistance of clutch springs (not shown) and of the return spring 20. In this position the main piston 5 forces the pressure liquid 16 from the main cylinder 6 via the conduit 7 into the clutch cylinder 8. The clutch piston 9 presses via the lifter 10 against the pressure disk 11 and disengages the clutch. The valve 14 is closed due to the force of the spring 19 and due to the presence of the pressure liquid 16 which urges the valve 14 into its closed position. The driver controls the movement of the pressure disk 11 by action on the control lever 2.

Figure 2:
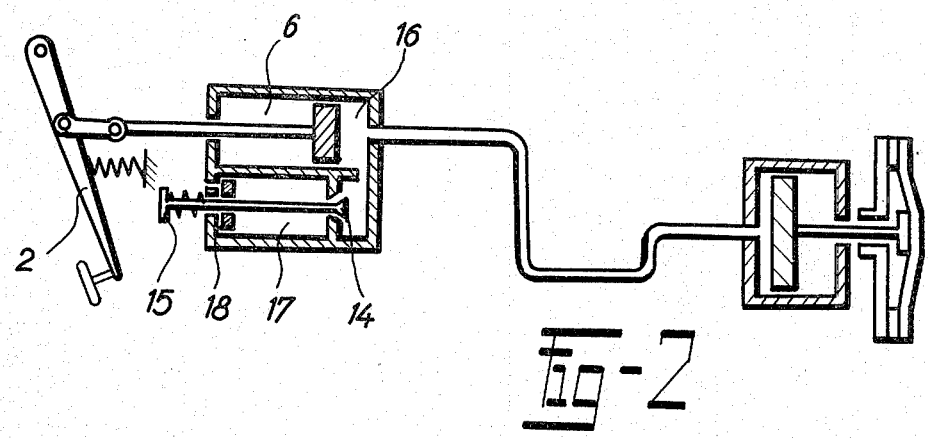
FIG. 2 shows the arrangement of FIG. 1 with a clutch closed by means of an auxiliary control button.

In FIG. 2 the arrangement is shown with a clutch closed by means of the control button 15. If the driver wants to close the clutch instantaneously, he presses the auxiliary control button 15, opening thus the valve 14 and enabling admission of pressure liquid 16 to the auxiliary cylinder 17. The pressure liquid 16 shifts the piston 18 and fills the whole space of the auxiliary cylinder 17. Due to escape of pressure liquid 16 from the main cylinder 6 the clutch is closed, without need of changing the position of the control lever 2.

Figure 3:
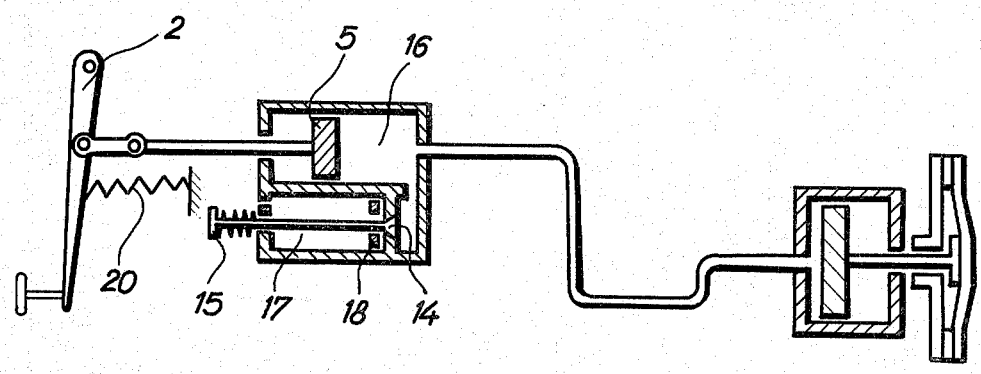
FIG. 3 the arrangement of FIG. 1 with a closed clutch and returned control lever.

After a quick start of the vehicle, the driver releases the control lever 2, which has no further influence on the performance of the clutch. The whole arrangement comes thereby into the position indicated in FIG. 3. The return spring 20 returns after release of the control lever 2 into its original position. The main piston 5 sucks thereby pressure liquid 16 from the auxiliary cylinder 17, as the valve 14 is opened due to the pressure drop in front of the piston 5 in main cylinder 6, thereby overcoming the force of the spring 19. Thus the control arrangement is prepared for a further disengagement of the clutch and for its repeated closing either by the control lever 2 or by the auxiliary control button 15.

Figure 4:
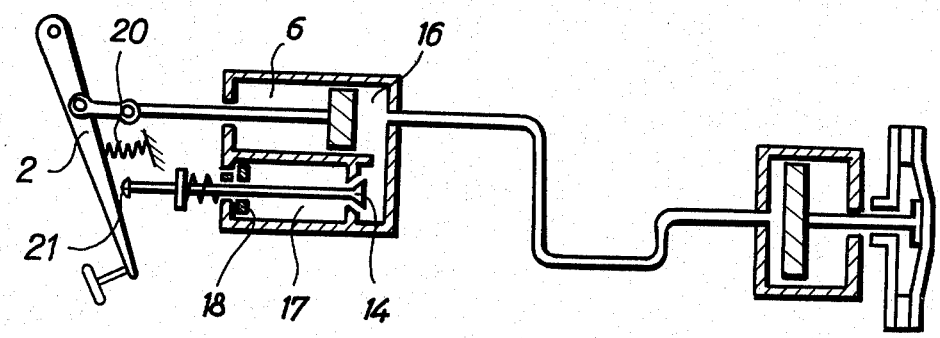
FIG. 4 an alternative arrangement adapted for closing the clutch by further pressing the control lever.

According to FIG. 4, the valve 14 is elongated so that its extension 21 reaches the control lever 2 in the pressed down position of the control lever which corresponds to a disconnected clutch. In the case of a further pressing down of the control lever 2, the extension 21 is simultaneously pressed down and the valve 14 opened, closing the clutch virtually instantaneously. After release of the control lever 2, the return spring 20 returns the control lever 2 to its original position, whereby the pressure liquid 16 is displaced from the auxiliary cylinder 17 into the main cylinder 6.

In all of the embodiments described above, the clutch can be quickly disconnected by applying pressure to close the clutch in the same direction as pressure is being applied to keep the clutch open. In contrast to the prior art, the direction of force application by the driver need not be reversed, thereby permitting the clutch to engage in a much shorter time than would otherwise be the case.

Figure 5:
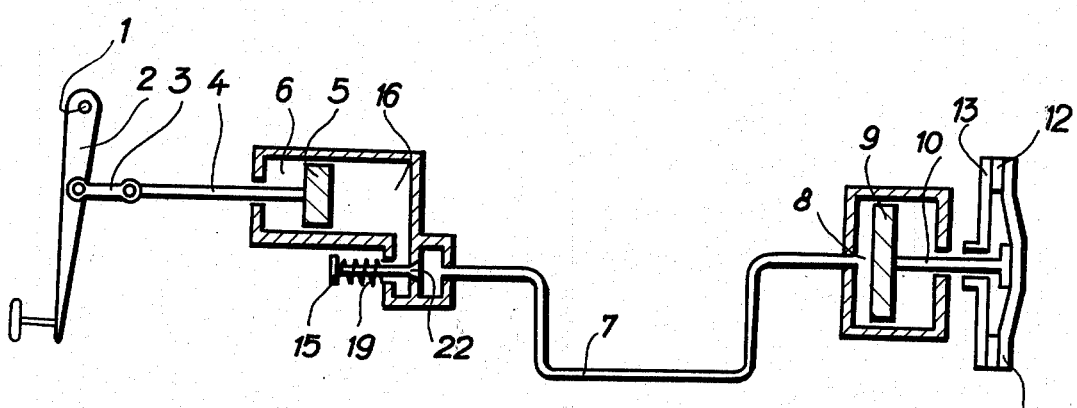
FIG. 5 a still further alternative of an arrangement with a return valve.

FIG. 5 shows an alternative of the disconnecting arrangement with a return valve, where a control lever 2, pivotably supported on the frame 1 is connected via a connecting rod 3 and a piston rod 4 with the main piston 5. The main piston 5 slides in the main cylinder 6, connected by the conduit 7 with the clutch cylinder 8. A clutch piston 9 contacting by means of a lifter 10 the pressure disk 11 is slidably mounted in the clutch cylinder 8. The pressure disk 11 presses the clutch plate 12 against the base plate 13 for a closed clutch by springs (not shown).

The arrangement comprises a return valve 22 fixedly connected to a control button 15, which in turn is provided with a return spring 19. When disconnecting the clutch by pressing down the control lever 2, the pressure liquid 16 opens the return valve 22 and the clutch is disconnected. As soon as the movement of the control lever 2 ceases, the return valve 22 closes due to the pressure of the spring 19 and the clutch remains in the adjusted disconnected position without need of pressing down the control lever 2. The clutch is closed by pressing the button 15, whereby springs (not shown) of the clutch exert pressure on the clutch piston 9. As a result, the pressure liquid 16 flows past the opened return valve 22 into the main cylinder 6. When conventional and normal operation of the arrangement for disconnecting the clutch is desired, the button 15 has to be maintained pressed down or secured in the pressed down position by an arresting pawl (not shown) so that the clutch may engage upon release of control lever 2. Quick closing of the clutch is obtained since the direction of force application on lever 2 to keep the clutch disengaged need not be reversed in order to close the clutch.

Modifications of the above-described embodiments may be made by those skilled in the art. It is intended to cover all such modifications which do not constitute departures from the spirit and scope of the invention as defined in the claims appended hereto.

We claim:

1. In an apparatus for operating a friction clutch of the type having lifter means operable, upon the application of force thereto, to effect the disengagement of a pair of clutch elements which are normally biased into frictional contact, operator foot control lever means, and means coupling the foot control lever means to the lifter means for the application of clutch disengaging force to said lifter means, and wherein said control lever means is movable in a given direction from a first position at which no force is applied to said lifter means by way of said coupling means to disengage said clutch elements to a second position at which force is applied to said lifter means by way of said coupling means to disengage said clutch means; the improvement wherein said coupling means comprises means responsive to movement of said foot control lever means in said direction to said second position for applying clutch disengaging force to said lifter means, and quick release control means coupled to said coupling means for rapidly releasing force applied to said lifter means by said foot control lever means, said control means comprising operator controlled button means movable to control the force transmitting characteristics of said coupling means between said lever means and said lifter means; said operator controlled button means being movable in said direction to control said force transmitting characteristics, and said button means being positioned to be engaged by said foot control lever means for movement in said direction.

2. In an apparatus for operating a friction clutch of the type having lifter means operable, upon the application of force thereto, to effect the disengagement of a pair of clutch elements which are normally biased into frictional contact, operator foot control lever means, and means coupling the foot control lever means to the lifter means for the application of clutch disengaging force to said lifter means, and wherein said control lever means is movable in a given direction from a first position at which no force is applied to said lifter means by way of said coupling means to disengage said clutch elements to a second position at which force is applied to said lifter means by way of said coupling means to disengage said clutch means; the improvement wherein said coupling means comprises means responsive to movement of said foot control lever means in said direction to said second position for applying clutch disengaging force to said lifter means, and quick release control means coupled to said coupling means for rapidly releasing force applied to said lifter means by said foot control lever means, said control means comprising operator controlled button means movable to control the force transmitting characteristics of said coupling means between said lever means and said lifter means; said coupling means comprising a hydraulic system including a first hydraulic cylinder having a piston coupled to said lifter means, a second hydraulic cylinder having a piston coupled to said foot control lever means, and a hydraulic transmission line intercoupling said cylinders, and wherein said hydraulic system further comprises valve means coupled to said button means for controlling the pressure in said hydraulic system.

3. The apparatus of claim 2 further comprising a chamber in said hydraulic system, said valve means interconnecting said second cylinder and chamber and being connected to said button means to be opened upon operation of said button means, whereby pressure in said hydraulic system resulting from movement of said control lever to said second position is released to said chamber upon operation of said button means.

4. The apparatus of claim 3 wherein said valve means comprises a valve responsive to pressure in said second cylinder less than in said chamber for releasing pressure to said second cylinder.

5. The apparatus of claim 4 wherein said button means is positioned to be engaged by said control lever upon movement of said control lever in said direction to a position beyond said second position.

6. The apparatus of claim 2 wherein said valve means is positioned to control the flow of fluid in said hydraulic system between said second cylinder and said hydraulic line, said valve means being positioned to inhibit the flow of fluid in said system only in the direction between said second cylinder and said first cylinder, and being open upon operation of said button means.

7. In an apparatus for controlling an automotive friction clutch of the type having a friction disk and a clutch plate and means for normally engaging said friction disk and said clutch plate, the improvement comprising pressure applying means for disengaging said clutch, said pressure applying means being movable in a predetermined direction from a first position at which no pressure is applied to disengage said clutch to a second position in which pressure is applied and said clutch is disengaged, said pressure applying means comprising a main hydraulic cylinder having a main piston, said main piston being mechanically connected to a control lever, a hydraulic clutch cylinder having a clutch piston, said clutch cylinder being connected to the main hydraulic cylinder, said apparatus further comprising means for quickly engaging said clutch, said means for quickly engaging said clutch being movable substantially along said predetermined direction from an inoperative position to an operative position in which the pressure applied by said pressure applying means is released, said means for quickly engaging the clutch comprising an auxiliary hydraulic cylinder, said auxiliary hydraulic cylinder having a valve, said valve being connected to a control button extending out of said auxiliary cylinder adapted to allow the passage of a part of the pressure liquid from the main hydraulic cylinder into the auxiliary cylinder when the control button is moved to an operative position and to prevent passage of pressure liquid into said auxiliary cylinder when said button is in its inoperative position, whereby said clutch is engaged when said means for quickly engaging said clutch has reached the operative position, said clutch being engaged without returning said pressure applying means to said first position.

8. In an apparatus for controlling an automotive friction clutch of the type having a friction disk and a clutch plate and means for normally engaging said friction disk and said clutch plate, the improvement comprising pressure applying means for disengaging said clutch, said pressure applying means being movable in a predetermined direction from a first position in which no pressure is applied to disengage said clutch to a second position in which pressure is applied and said clutch is disengaged, said pressure applying means comprising a main hydraulic cylinder having a main piston mechanically connected to a movable control lever, a hydraulic clutch cylinder having a clutch piston, said clutch cylinder being connected to the main hydraulic cylinder via a return valve, and means for quickly engaging said clutch, said means for quickly engaging said clutch being movable substantially along a predetermined direction from an inoperative position to an operative position in which the pressure applied by said pressure applying means is released, and comprising a control button connected to one end of said return valve extending from said apparatus, said control lever being movable from said first position to a second position to disconnect said clutch, said clutch remaining in the disengaged position after said control lever has been released, whereby said clutch is engaged when said means for quickly engaging the clutch has reached the operative position.

9. In an apparatus for operating a friction clutch of the type having lifter means operable, upon the application of force thereto, to effect the disengagement of a pair of clutch elements which are normally biased into frictional contact, operator foot control means, and means hydraulically coupling the foot control lever means to the lifter means for the application of clutch disengaging force to said lifter means, and wherein said control lever means is movable in a given direction from a first position at which no force is applied to said lifter means by way of said hydraulic coupling means to disengage said clutch elements to a second position at which force is applied to said lifter means by way of said hydraulic coupling means to disengage said clutch means; the improvement wherein said hydraulic coupling means comprises means responsive to movement of said foot control lever means in said direction to said second position for applying clutch disengaging force to said lifter means, and quick release control valve means coupled to said hydraulic coupling means for rapidly releasing force applied to said lifter means by said foot control lever means, and operator controlled button means connected to said control valve means and movable to open said control valve means to release pressure in said hydraulic coupling means resulting from movement of said control lever means to said second position.

* * * * *